3,403,282
DISPENSER TYPE CATHODE
Helmut Katz, Munich, Germany, assignor to Siemens
Aktiengesellschaft, a corporation of Germany
Filed Nov. 30, 1965, Ser. No. 510,606
Claims priority, application Germany, Dec. 2, 1964,
S 94,410
2 Claims. (Cl. 313—346)

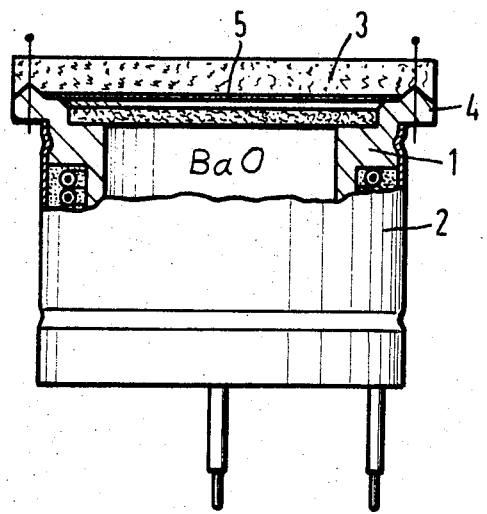

ABSTRACT OF THE DISCLOSURE

A dispenser type cathode having a supply chamber in which is disposed a supply of emission substance with the chamber having an opening for the discharge of barium from such supply which opening is covered by a sintered porous member of high melting metal, through which emission material may migrate, the inner face of the emission carrier being provided with a thin coating of aluminum oxide which effects a uniform distribution of the barium to the cathode surface of the emission substance carrier.

---

The invention relates to a cathode for electrical discharge vessels, in the operation of which emission substances pass from a storage supply through fine apertures of a porous emission substance carrier made of especially porously sintered high-melting metal, such as, for example, tungsten, covering the supply of emission substance and providing the means for supplying the cathode surface, in which the supply substances consist essentially of alkaline earth oxides, particularly barium oxide.

Alkaline earth metal oxides are utilized instead of corresponding carbonates because of the well known appreciable disadvantages of the carbonates which appear especially in the necessary heat treatment processes, for example, at the high-vacuum pump or at the corresponding automatic devices.

The difficulties arising in the use of alkaline earth metal oxides, especially of barium oxide, are likewise well known, especially with respect to atmospheric influences. The access of moisture to the barium oxide must, therefore, be avoided, not only in the production and introduction of a supply, but especially, too, in the storage of the cathodes in question and during their installation in a discharge vessel. For the attainment of this objective very divergent approaches have therefore already been undertaken.

Thus, attempts have been made to counteract the absorption of moisture in the barium oxide by the method, to be sure, only on a very limited scale, of using mixed oxides instead of pure barium oxide which, when they have absorbed moisture, again decompose before they melt as the temperature rises, so that at least no melt passes through the porous slits. Regardless of this, however, the other drawbacks of high moisture content in tubes, the avoidance of which is particularly desired, continued to be present. Moreover, the amount of barium which can be accommodated in a certain volume is then considerably smaller than in the case of pure BaO, so that at the same evaporation rate a shortening of the useful life results.

Consequently, in another known dispenser type of cathode, there has been added, among other things, to the supply of barium oxide, in addition to reducing agents, so-called acid forming oxides, such as beryllium oxide, zircon oxide, titanium oxide, silicon oxide, aluminum oxide and zinc oxide in such a considerable excess that at the highest temperatures occurring in the supply container there does not, in any case, occur a melting of the supply. Moreover, the added oxides are supposed to prevent the barium oxide of the supply substance from being attacked by the atmosphere. The essential drawback of this known measure lies above all in the fact that, as can easily be perceived, the protection by the added oxides against atmospheric influences is altogether inadequate even with an abundant excess, and moreover, again such an excess requires either a considerably larger supply container, and thereby correspondingly larger cathode dimensions (which has an unfavorable effect on the economy and the characteristic data of the electric discharge vessel concerned, especially those for UHF operation), or the useful life, as well as the functional mechanism of the discharge vessel concerned, are unfavorably affected.

The basic problem of the invention thus consists in avoiding, in a supply cathode, in particular a metal capillary cathode, with a storage supply largely of barium oxide, the troublesome influences of moisture content as well as the drawbacks hitherto occurring in the case of such measures for the reduction thereof. Moreover, the means of this measure are simultaneously utilized to keep the barium evaporation rate at a given manner of operation of the discharge vessel concerned so small that a speed of an optimum of migration and, moreover, a uniform distribution of the barium reducing out over all the pores, is achieved, especially in the case of differing pore sizes.

This is achieved, in a cathode of the dispenser type for electrical discharge vessels, in the operation of which emission substances from an emission substance supply pass through fine apertures of a porous emission substance carrier, covering such supply, constructed of, in particular, a sintered, porous member of high-melting metal, such as, for example, tungsten, to the cathode surface, and in which the supply emitting barium during operation consists of alkaline earth metal oxide and, moreover, in the supply chamber aluminum oxide is present in a small amount, according to the invention by an arrangement in which the aluminum oxide is applied to the porous emission substance carrier on its face adjacent to the supply in the form of a thin coating. The invention is explained in more particular detail with the aid of an example of construction illustrated merely schematically in the drawing. In this figure parts which do not contribute to the understanding of the invention have been omitted or have remained undesignated.

In the example of construction, partially illustrated in section, the pot-shaped supply container 1, which is surrounded by the cathode shell 2, the open end of which is covered by a sintered, porous emission substance carrier 3 of, for example, tungsten, which is tightly joined therewith at a flange 4. The inner face of the emission substance carrier 3 is covered with a thin layer 5 of aluminum oxide which is applied before the assembling of the cathode and possibly may be sintered on. The layer covers the open pores, closing them so that in operation the barium liberated from the supply substance in the container 2, namely barium oxide, will strike the aluminum oxide layer 5 and thus will not directly strike the carrier 3. Since the barium or barium oxide, practically solely by reason of solid body reactions, for example, its aluminate formation, so that when a certain saturation is reached, following upon its re-formation, that is, a reduction under a cooperative effect of the tungsten, can pass through such layer into the pores of the tungsten and from there to the emission surface, the thin aluminum layer acts, as it were, as a very fine distributing sieve. The aluminate formed thus takes over the uniform distribution of the barium throughout the pores, so that differences in pore sizes, generally unavoidable, no longer can have a bad effect. In addition, the cathode has the appreciable advantage that it emits less harmful evaporation products than a cathode charged only with barium oxide. The cathode described is distinguished by a very high uniformity of the emission, as well as by a long useful life, because the disadvantages associated with the generally undesirably larger pores are eliminated. Moreover, disadvantageous effects on other electrodes are considerably reduced.

Changes may be made within the scope and spirit of the appended claims which define what is believed to be new and desired to have protected by Letters Patent.

I claim:

1. A cathode for electrical discharge vessels, in which during operation emission substance travels from a supply of an emission substance, through fine apertures of a porous emission substance carrier to the cathode surface, comprising means forming a supply chamber in which is disposed a supply of emission substance consisting largely of barium oxide, said chamber having an opening for the discharge of barium from said supply, a sintered, porous member of high-melting metal covering said opening, aluminum oxide disposed in said chamber in the form of a thin coating on the adjacent face of said porous emission substance carrier, said aluminum oxide coating being present for effecting uniform distribution of the barium to the cathode surface of the emission substance carrier.

2. A cathode according to claim 1, wherein said emission substance carrier is formed from sintered tungsten, on which the aluminum oxide coating is sintered.

References Cited
UNITED STATES PATENTS

| 2,006,081 | 6/1935 | Anderson et al. | 313—317 X |
| 2,499,192 | 2/1950 | Lafferty | 313—346 X |
| 2,808,530 | 10/1957 | Katz | 313—346 X |
| 3,149,253 | 9/1964 | Luebke | 313—346 X |
| 3,155,864 | 11/1964 | Coppola | 313—337 X |

JOHN W. HUCKERT, *Primary Examiner.*

A. J. JAMES, *Assistant Examiner.*